Feb. 24, 1970  W. M. SCRIMGEOUR  3,496,888
SANITARY RACK
Filed July 24, 1968
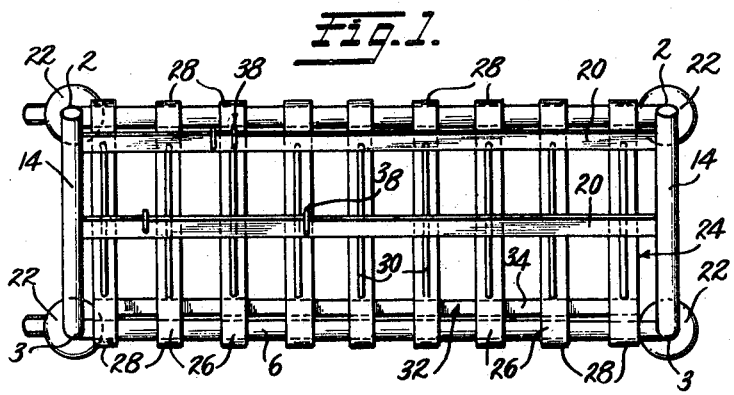
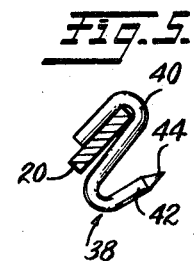
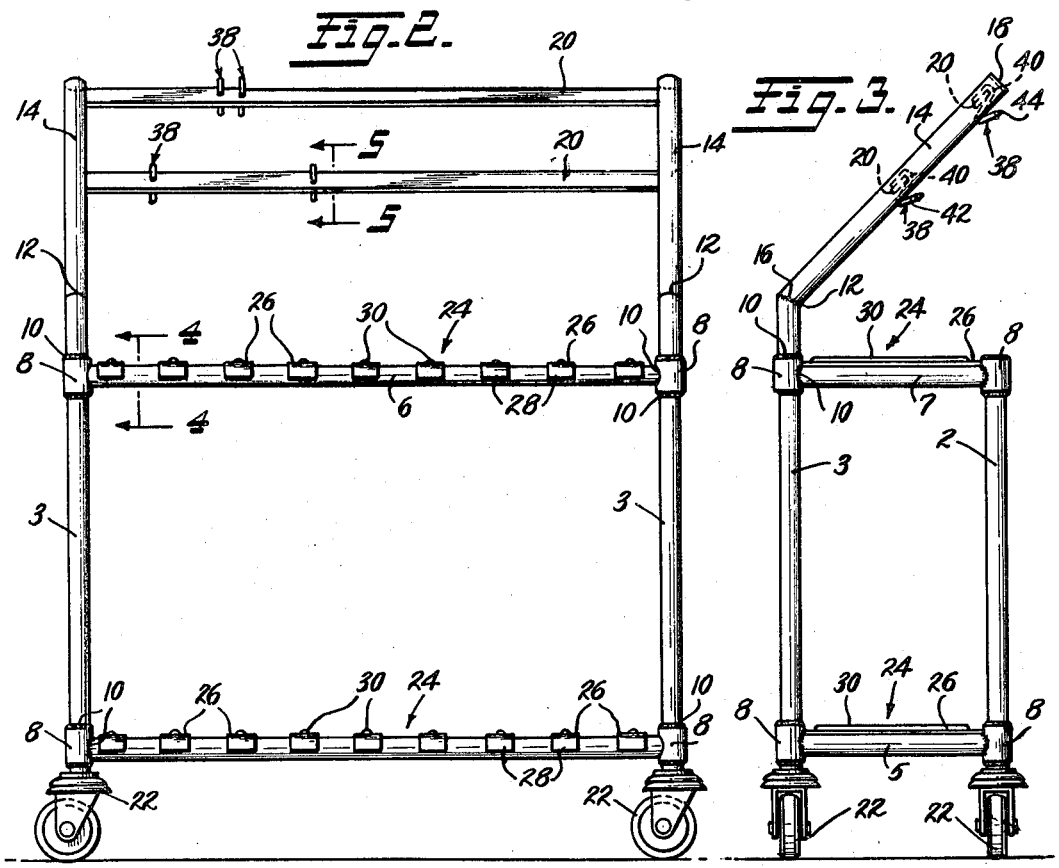
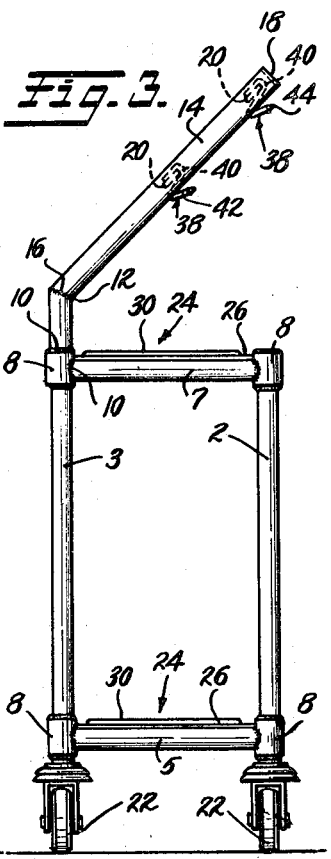
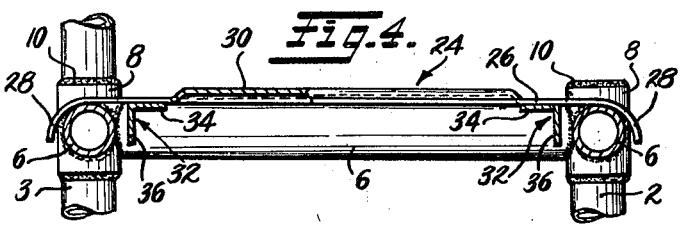
INVENTOR.
WILLIAM M. SCRIMGEOUR
BY
Bacon & Thomas
ATTORNEYS United States Patent Office 3,496,888
Patented Feb. 24, 1970

3,496,888
SANITARY RACK
William M. Scrimgeour, 4832 Oxford Drive SE.,
Marlow Heights, Md. 20023
Filed July 24, 1968, Ser. No. 747,379
Int. Cl. A47b 53/00
U.S. Cl. 108—32     5 Claims

ABSTRACT OF THE DISCLOSURE

An easily steam-cleaned rack frame of stainless steel tubes and bars welded together to eliminate crevices, cracks or other openings in which dirt may accumulate. Welded removable shelves and hooks are supported by horizontal frame members without any openings, sockets or other dirt accumulating depressions, so they may be readily removed and all components thoroughly steam cleaned and sterilized.

BACKGROUND OF THE INVENTION

This invention relates to racks, particularly suitable for use in food preparation areas.

In relatively large institutions, for example, restaurants, hospitals and/or Army kitchens, large numbers of utensils are employed and must be moved from place to place in addition to being stored during periods of nonuse. It is essential that such storage facilities be kept extremely sanitary at all times to avoid accumulating contamination and desirably such racks are steam cleaned periodically to thereby not only be cleaned but thoroughly sterilized. Previous constructions known to applicant are not completely satisfactory for this purpose since they all contain crevices or corners in which minute quantities of dirt could accumulate and eventually contaminate the rack. Even steam cleaning is not effective to remove all impurities from small crevices and sharp corners.

SUMMARY OF THE INVENTION

In general the present invention comprises a rack particularly for the storage and transport of cooking utensils or the like, formed preferably of stainless steel and fabricated entirely by welding parts together so the beads resulting from the weld eliminate any possibility of concavities, crevices or sharp corners and lend themselves readily to thorough and efficient steam cleaning.

BRIEF DESCRIPTION OF THE DRAWNGS

FIG. 1 is a top plan view of a rack exemplifying the present invention;

FIG. 2 is a front elevational view of the rack of FIG. 1;

FIG. 3 is an end elevational view of FIG. 2;

FIG. 4 is an enlarged fragmentary cross-sectional view taken on the line 4—4 of FIG. 2; and FIG. 5 is an enlarged fragmentary sectional view taken on the line 5—5 of FIG. 2.

DESCRIPTION OF A PREFERRED EMBODIMENT

The example of applicant's invention illustrated in the drawings will preferably be made entirely of stainless steel which lends itself admirably to steam cleaning and thorough sterilization without corrosion. The rack shown comprises upstanding front corner posts 2, rear corner posts 3, and horizontal frame members 4, 5, 6 and 7. The horizontal frame members 4 and 5 define a rectangular horizontal frame near the bottom of the rack whereas the members 6 and 7 define a rectangular horizontal frame near the top of the rack. The vertical and horizontal members 2, 3, 4, 5, 6 and 7 are preferably joined by means of tubular coupling elements 8 but instead of being threaded thereinto or press-fitted therein the parts are welded together after assembly, thus providing weld beads 10 effectively eliminating corners or crevices in which dirt could accumulate. The rearmost pair of uprights 3 extend upwardly above the upper horizontal frame defined by members 6 and 7 to a juncture 12 with upwardly and forwardly inclined tubular frame members 14. The frame members 14 and 3 are joined at the juncture 12 by welding, thus producing a weld bead 16 likewise eliminating cracks and crevices at this region. While not shown, the upper ends 18 of the frame members 14 are preferably closed and sealed by welding suitable cap elements thereover. Extending horizontally between the inclined frame members 14 is a pair of strap-like bars 20 welded at their ends to the inner surfaces of frame members 14 and arranged so that their longest transverse axis is substantially parallel to the longitudinal axes of the frame members 14. Thus, the bars 20 assume an inclined position, or tilt.

The lower ends of the vertical frame members 2 and 3 are preferably left open to receive suitable or conventional casters designated generally at 22.

Resting removably on each rectangular horizontal frame defined by the members 4, 5, 6 and 7, are shelves designated generally at 24. The two shelves shown are preferably identical so that only one will be described in detail. Each shelf comprises a plurality of transverse stainless steel straps or strips 26, each having its opposite ends curved downwardly, as shown in 28 of FIG. 4 to conform substantially but loosely to the outer surfaces of the longitudinal horizontal frame members 6. The intermediate portion of each strip 26 is provided with an upwardly struck hollow rib 30 to provide strength against bending and to reduce friction and wear when sliding utensils on and off the shelf. The strips 26 are preferably equally spaced along the length of their associated frame members and are unitarily joined by longitudinally extending angle members 32. Each angle member 32 has a horizontal flange 34 welded to the under surface of each strip 26 and a vertical flange 36 extending downwardly adjacent to but inwardly of, and preferably parallel to, the inner surface of its nearest long frame member 6. Thus, the vertical flanges ensure against accidental dislodgement of the shelf in the event a utensil being slid therefrom would catch or for other reasons apply horizontal force to the shelf.

As shown best in FIG. 5, a plurality of generally S-shaped hooks 38 are loosely and displaceably supported on the horizontal oblique bars 20. Each of the hooks 38 is provided with a relatively narrow, generally U-shaped upper half 40 fairly snugly embracing the strips or bars 20, and the lower leg of the U-shaped portion is then curved downwardly, then obliquely upwardly to define a leg 42 and a point 44. Thus, the various portions of the hooks define the S-shape previously referred to. The hooks 30 may be employed for hanging certain utensils or other kitchen-oriented equipment and as is obvious, they may be readily removed and thoroughly sterilized themselves in addition, to thus expose all surfaces of the bars 20 to steam cleaning and sterilization.

Thus, applicant has provided a rack completely free of cracks, crevices, corners, or openings in which dirt could accumulate and from which it would be difficult to remove the same by ordinary cleaning methods. All that is necessary in applicant's construction is to remove the hooks 38 and the shelves 24 whereupon the entire rack frame may be thoroughly steam cleaned and sterilized, as can all surfaces of the shelves and hooks.

While a single embodiment of the invention has been shown and described herein, the same is merely illustrative of the principles involved.

I claim:

1. A sanitary rack comprising: upright noncorrosive metal corner posts; horizontal noncorrosive metal members welded to said posts to define a plurality of rectangular frame portions at different levels; at least certain opposed horizontal members of each rectangular frame having cylindrical outer surfaces; a shelf removably supported by each rectangular frame portion and comprising a plurality of spaced parallel noncorrosive metal straps spanning said opposed horizontal members and having downwardly curved end portions resting on and substantially conforming to said cylindrical surfaces; and elongated metal members welded to the undersurfaces of said straps and extending parallel to and adjacent and between said opposed horizontal members.

2. A sanitary rack as defined in claim 1 wherein said elongated metal members comprise right-angular flanges, one flange abutting the undersurface of said straps and the other depending downwardly therefrom adjacent the inner edges of said opposed horizontal members.

3. A sanitary rack as defined in claim 1 wherein each of said straps is provided with a central upstanding hollow rib extending longitudinally thereof between said end portions.

4. A sanitary rack as defined in claim 1 including upwardly extending portions of a pair of adjacent posts; above said rectangular frame portions, extending obliquely over said rack in generally parallel relation; a plurality of parallel bars extending between said upwardly extending portions and welded at their ends thereto; and a plurality of generally S-shaped hooks removably supported by said parallel bars whereby to hold articles suspended over said rack.

5. A sanitary rack as defined in claim 4 wherein said parallel bars are of elongated rectangular cross-sectional shape with their wide dimension extending obliquely upwardly, each of said hooks having an upper portion of relatively narrow U-shape embracing the upper edge portion of one of said bars.

References Cited

UNITED STATES PATENTS

| | | | |
|---|---|---|---|
| 2,680,522 | 6/1954 | Temple | 108—59 |
| 2,761,568 | 9/1956 | Temple | 108—59 |
| 2,798,617 | 9/1957 | Schreiber | 108—32 |
| 2,963,172 | 12/1960 | Lowell et al. | 108—29 |
| 3,016,650 | 1/1962 | Mayers | 108—32 |
| 3,172,376 | 3/1965 | Harlis | 108—59 |

BOBBY R. GAY, Primary Examiner

GLENN O. FINCH, Assistant Examiner

U.S. Cl. X.R.

108—59